United States Patent [19]

Molack

[11] 3,849,671

[45] Nov. 19, 1974

[54] PHASE DETECTOR CIRCUITRY

[75] Inventor: Michael A. Molack, Nesconset, N.Y.

[73] Assignee: Dynell Electronics Corp., Melville, N.Y.

[22] Filed: May 15, 1972

[21] Appl. No.: 253,377

[52] U.S. Cl. .................. 307/232, 307/210, 307/262, 307/295, 328/133

[51] Int. Cl. .......................................... H03d 13/00

[58] Field of Search ........... 307/295, 232, 210, 262; 328/133

[56] References Cited

UNITED STATES PATENTS

| | | | |
|---|---|---|---|
| 3,187,195 | 6/1965 | Stefanov | 307/88.5 |
| 3,328,688 | 6/1967 | Brooks | 324/83 |
| 3,430,148 | 2/1969 | Miki | 328/133 |
| 3,509,476 | 4/1970 | Roth | 328/134 |
| 3,517,322 | 6/1970 | Lay | 328/133 |
| 3,517,323 | 6/1970 | Rudin | 328/155 |
| 3,602,994 | 9/1971 | Layman | 328/134 |
| 3,626,307 | 12/1971 | Koyama | 328/133 |
| 3,646,452 | 2/1972 | Horowitz et al. | 328/63 |
| 3,657,659 | 4/1972 | Johnson | 328/133 |
| 3,731,210 | 5/1973 | Mollod | 328/155 |
| 3,743,754 | 7/1973 | Eisenberg | 35/10.2 |

*Primary Examiner*—Rudolph V. Rolinec
*Assistant Examiner*—Joseph E. Clawson, Jr.
*Attorney, Agent, or Firm*—Eisenman, Allsopp and Strack

[57] ABSTRACT

This phase detector circuitry is operative to compare different binary signals of known repetition rate, recurring in discrete time intervals with a digitally created reference signal. Comparison is accomplished with a logic OR gate which controls a reversible counter that in turn provides an output used to modify the phase of the reference signal.

7 Claims, 8 Drawing Figures

PHASE DETECTOR CIRCUITRY

BACKGROUND OF THE INVENTION

1. Field of the Invention

The present invention relates to phase detector circuits; more particularly it relates to digital phase detector circuits.

2. Description of the Prior Art

The basic function of a phase detector is to quantitatively determine the phase of an input signal relative to that of a reference signal. This information is made available as an output which varies in some manner indicative of the phase difference.

In copending application Ser. No. 35,433, filed May 7, 1970, and assigned to Dynell Electronics Corporation, there is disclosed a receiver for use in conjunction with the OMEGA Navigation System. This system employs a plurality of transmitters, each transmitting low frequency signals in discrete time intervals. The transmitters are strategically located to insure that the signals from several transmitters will always be available from any point on the earth. By identifying the signals and comparing the phase relationship, a navigator is able to establish his position with great accuracy.

The receiver disclosed in the cited application employs a phase detector operating into an integrator that functions in an analog fashion to produce the desired information. This data is then converted to use with the generally digital circuitry employed throughout the major portion of the receiver.

SUMMARY OF THE INVENTION

In contrast with the phase detector and integrator circuitry referred to above, this invention relates to completely digital phase detection circuitry which measures the relative phase between a received signal and a reference signal and produces a binary output which is a logic "1" if the reference signal leads the received signal by more than 90° and a logic "0" if the reference signal leads the received signal by less than 90°.

A principal object of the invention is to provide an improved digital phase detector.

Another object of the invention is to provide an improved digital phase detector operative upon a plurality of sequentially received signals recurring at a relatively high rate.

In accordance with a particular embodiment of the invention there is provided a phase detector operative in response to a plurality of sequentially applied binary signals having discrete intervals therebetween, comprising logic means for comparing said applied signals with a reference signal of similar characteristics, but different phase, said logic means producing a first output when the binary state of each signal is the same and a second output when the binary state of each signal is different; counting means responsive to count in response to a continuously applied signal, and controlled by said first and second outputs to count up or down, respectively, whereby the number registered in said counter is commensurate with the difference in phase between said signals.

A more complete understanding of the invention and a better appreciation of the features thereof will be available from the following detailed description of a preferred embodiment.

DESCRIPTION OF THE PREFERRED EMBODIMENT

The phase detector of the present invention finds particularly advantageous use in receivers of the type disclosed in the aforecited application. For this reason, and in the interest of providing the reader with a full understanding of the functioning of such a phase detector, reference to that application is recommended. A general appreciation of the signals acted upon by the circuitry of this invention will be available upon brief consideration of FIGS. 1 and 2.

Figure 1:
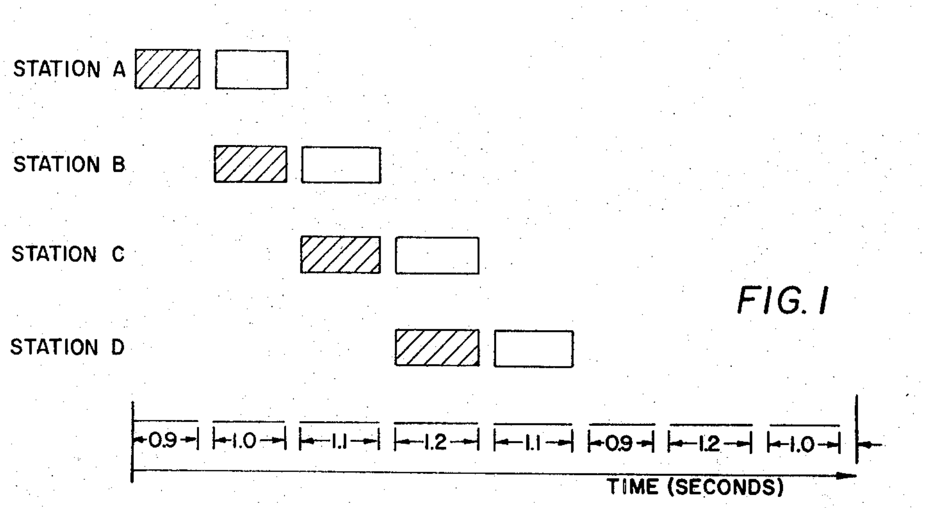
FIG. 1 is a timing diagram illustrating the duration of signals produced by four typical Omega transmitting stations.

The Omega Navigation System is a system wherein each transmitter furnishes signals having a range of 5,000 to 8,000 miles. These signals make it possible to provide overlapping or redundant navigation over the entire earth with only eight transmitting stations. The transmissions from each station are synchronized relative to every other station in accordance with a predetermined program. As illustrated in FIG. 1, bars representative of the transmission time from four stations, A, B, C, and D, are disposed in separate horizontal rows. The abscissa in this figure represents time. Each station transmits a continuous wave at two distinct frequencies: 10.2 kilohertz transmissions (which are used for fundamental measurements) are shown as a shaded bar; and 13.6 kilohertz transmissions (which are used for lane resolution) are shown as an unshaded bar. Although only four stations are specifically illustrated, it will be understood that transmissions from the remaining four stations may be similarly represented and may be considered to transmit in sequence for 1.1 seconds, 0.9 second, 1.2 seconds, and 1.0 second, respectively. The complete cycle illustrated in FIG. 1 repeats every 10 seconds. During this interval, there are eight transmission periods of variable length, and a 0.2 second interval between each transmission period. Only one station transmits on a particular frequency during each of the periods. Thus, the transmissions from each station are unambiguous and unique.

Figure 2:
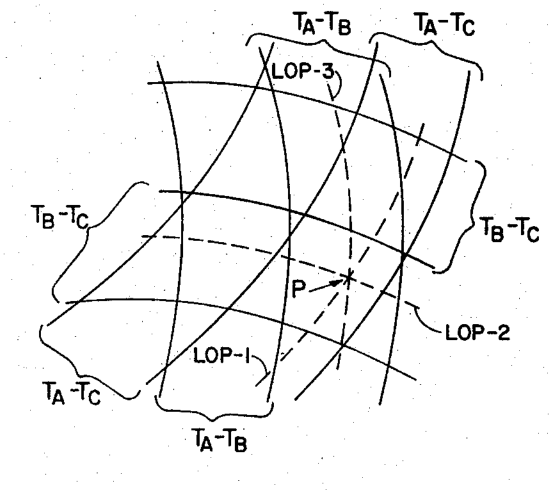
FIG. 2 is an illustrative sketch of a small portion of an Omega navigation chart useful in understanding the Omega long-range navigation system.

Considering the relationship of wavelengths to distance, the relative phase between two transmitters will recur along the base line at intervals of 8 miles. These intervals, called "lanes," are determined by the one-half wavelength of 10.2 kilohertz. FIG. 2 represents a small segment of an Omega navigation chart and illustrates a receiver position P. The chart shows several lanes defined by the signals from three transmitters A, B, and C. Lanes $T_A$–$T_C$ are defined by the signals from transmitters A and C; lanes $T_A$–$T_B$ are defined by the signals from transmitters A and B; and lanes $T_B$–$T_C$ are defined by the signals from transmitters B and C.

In order to obtain a position fix, one first selects a pair of transmitters, e.g., A and C, and measures the difference in phase between the continuous 10.2 kilohertz wave signals received therefrom. This will yield a hyperbolic Line-of-Position (LOP), LOP-1, for the observer. The same process is then repeated for one or more additional transmitter pairs, e.g., B and C, and A and B, in order to generate additional Lines-of-Position, LOP-2, LOP-3, respectively. The receiver's position is accurately determined by the intersection of any two LOPs.

Although the transmitted signals from each station are synchronized, they include neither synchronization nor phase reference information. Thus, the phase shift between each pair of transmitters must be measured relative to the phase of a local source. In order to establish the relative phase of two received signals, and utilize this information, the desired signals must be identified, separated from one another, and "locked onto" in a manner that will permit their continuous phase tracking and facilitate the subsequent measurement of phase differences. A receiver for handling such operations is fully disclosed in aforecited application Ser. No. 35,433.

Figure 3:
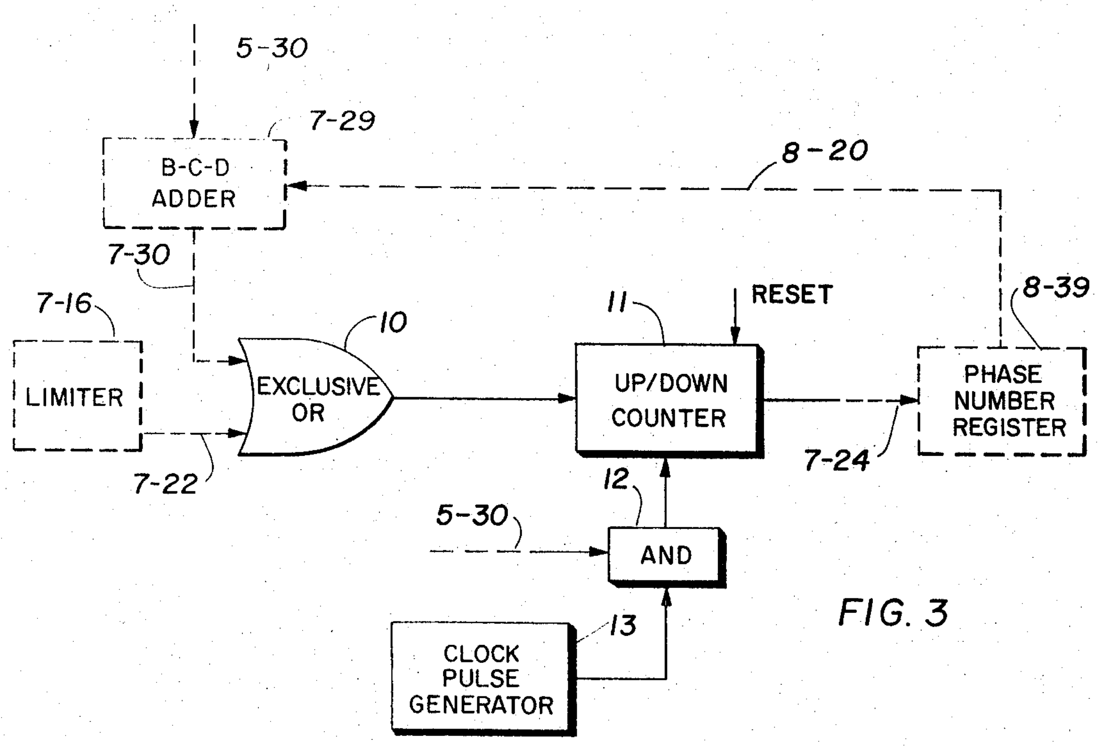
FIG. 3 is a logic circuit schematic showing circuitry embodying the features of the present invention and functioning in conjunction with a typical Omega Receiver.

FIG. 3 includes the specific circuit elements of the present invention designated by single decimal numbers 10 through 13. The circuit elements previously described in connection with the receiver shown in application Ser. No. 35,433 are designated by the dual decimal notation used in that application. Since the combined effect of these elements is important, this representation is believed to be of assistance. For further clarity, the elements previously shown in the cited application and their general interconnection, are shown by dashed lines.

The Binary-Coded-Decimal Adder 7-29 may be a two decade unit, each decade comprising four stages re-entrantly connected to yield a decimal count of 10. It is adapted to add from 0 to 99 at a 1.02 megahertz rate such that a complete adding cycle occurs at the rate of 10.2 kilohertz. The actual number registered in Adder 7-29 can be modified by an input over cable 8-20 which imposes a predicted "Phase Number" upon the Adder.

A logic "1" output is provided by Adder 7-29 on lead 7-30 when the count reaches 50. This output terminates when the count reaches 99. Thus, the output is a gate. In view of the frequencies employed, the combination of Adder 7-29 and Register 8-39 acts as a phase shifter. By varying the predicted Phase Number, the gate can be moved in 1-microsecond increments to any desired position in time. This gate may be used as the reference signal for the phase detector and is applied as one input to an Exclusive OR Gate 10. A second input to OR Gate 10 is applied over lead 7-22 and in the illustrative embodiment is, a 10.2 kilohertz input signal whose phase is to be detected.

As explained previously, the function of the phase detector circuitry is to measure the phase difference between a reference signal and an applied signal. Within the framework of the system being described, the phase detector circuitry will measure the phase difference between the reference signal on lead 7-30 and the received signal on lead 7-22.

Figures 4A, 4B, 4C:
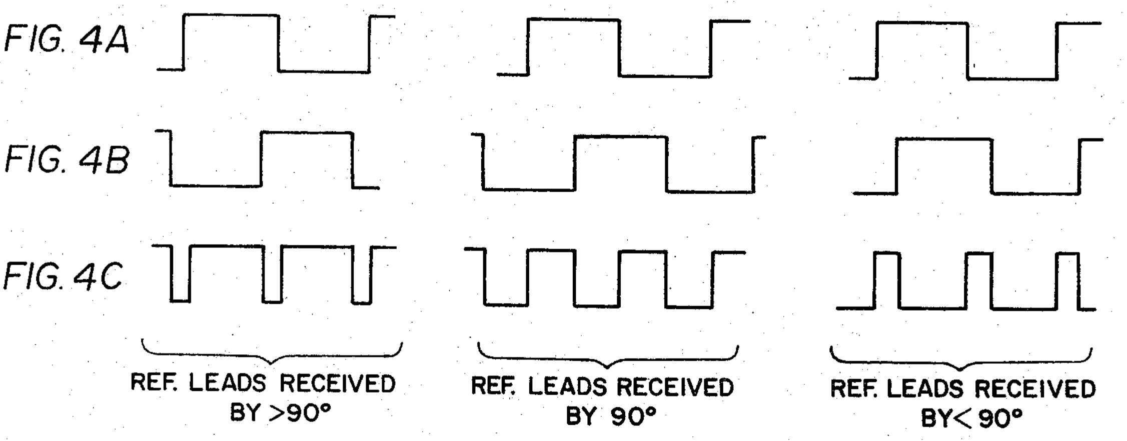
FIGS. 4A, 4B, and 4C are a plurality of waveforms illustrating various signal conditions appearing at critical points in the circuitry of FIG. 3.

FIGS. 4A and 4B show these relative phase conditions between the reference signal on 7-30 and received signal on lead 7-22, respectively. The figures are divided into three sections; the first showing the reference signal leading the received signal by more than 90°; the second showing the reference signal leading the received signal by exactly 90°; and the third showing the reference signal leading the received signal by less than 90°.

Exclusive OR Gate 10 produces a logic "1" output when the inputs are of opposite state and a logic "0" output when the inputs are of similar state. FIG. 4C shows the output of Exclusive OR Gate 10 under the three conditions described above. This output will be seen to be mostly logic "1" when the reference signal leads the received signal by more than 90°; mostly logic "0" when the reference signal leads the received signal by less than 90°; and a square wave when the reference signal leads the received signal by exactly 90°.

Up/down Counter 11 is adapted to count continuously in response to clock pulses from AND Gate 12. The direction of count, either up or down, is determined by the logic state applied to the control input from Exclusive OR Gate 10. The clock pulses should preferably be asyncronous to the 10.2 kilohertz square wave. Using a clock in this manner gives a true sampling of the phase being measured. If the clock and output of the Exclusive OR Gate are synchronized, there may be cases where the wrong output will result. AND Gate 12 is used to control supply of the clock pulses during presence of signals being detected. The enabling signal may be obtained for example from gates 5-30 described in the aforecited application. The Counter 11 is reset to zero between each complete cycle of operation.

Figure 5:
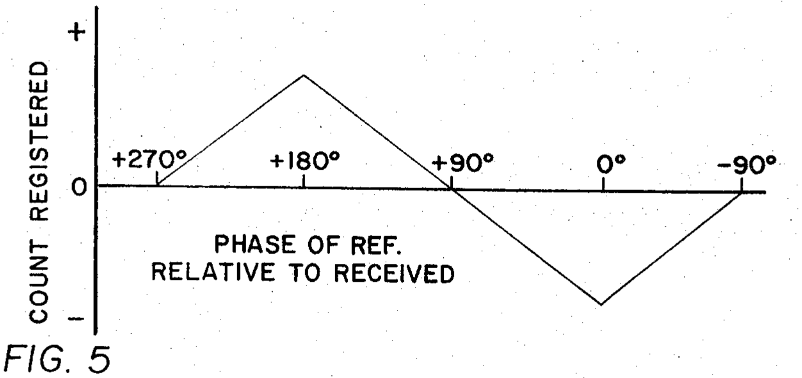
FIG. 5 is a graph representing the state of the counter in FIG. 3, as a function of the phase difference between an applied signal and a reference signal.

Counter 11 functions as a digital integrator producing a registered count proportional to the phase difference between the reference signal and received signal as shown diagrammatically in FIG. 5, where the ordinate represents the number registered and the abscissa denotes the relative phase between the reference signal and the received signal.

Counter 11 increases the number registered whenever the output of OR Gate 10 is at logic "1" during a clock pulse. Conversely, it decreases the number registered whenever the output of OR Gate 10 is at logic "0" during a clock pulse.

Figure 6:
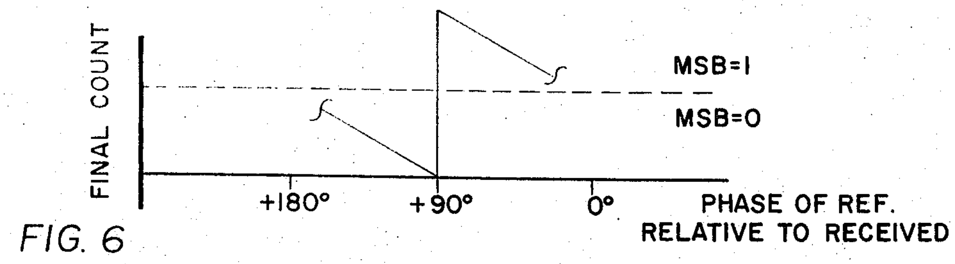
FIG. 6 is a graph showing the state of the most significant bit of the counter in FIG. 3, as a function of the phase difference between an applied signal and a reference signal.

When the enabling signal to AND Gate 12 is alligned with the received signals, the number in Counter 11 at the end of a cycle will be proportional to the integral of the OR Gate output over the signal reception time. The final count can thus be illustrated as shown in FIG. 6, as a function of the relative phase between the received signal and reference signal.

When the relative phase between the received signal and reference is exactly 90°, the final count will be zero. When the relative phase differs from 90°, the count will not be zero. The direction of the phase lead or phase lag is discretely indicated by the state of the most significant bit of the Counter 11. As illustrated in FIG. 6, for relative phases greater than 90° the most significant bit in a binary counter is at logic "0." Conversely for relative phases less than 90° the most significant bit is at logic "1."

With the knowledge of the direction of phase error, one may apply this information in a feedback loop to adjust the reference signal until registration is achieved. The circuit of FIG. 3 illustrates the manner in which this can be done by applying the signal representative of the most significant bit over lead 7-24 to Phase Number Register 8-39 in order to modify the number registered therein. This number is then employed via lead 8-20 to change the number registered in Binary Coded Decimal Adder 7-29, which it will be recalled, generates the reference signal on lead 7-30.

The invention has been shown and described in conjunction with portions of circuitry previously disclosed in a co-pending patent application. Those skilled in the art will immediately recognize the application of the inventive circuitry in other combinations and with certain modifications. It is intended to cover all such modifications as may come within the scope of the appended claims.

I claim:

1. A phase detector operative in response to first and second binary signals occurring at a known frequency and recurring in discrete time intervals, comprising means for producing one discrete output when said first and second signals are of similar sense and another discrete output when said first and second signals are of a different sense, a source of pulses, counting means operative to continuously count said pulses and register indications in ascending order or descending order under control of said one or said other discrete output, respectively, and means for synchronizing said registration with one of said signals.

2. A phase detector as defined in claim 1, wherein the first-mentioned means is an exclusive OR gate having first and second inputs supplied by said recurring binary signals.

3. A phase detector as defined in claim 1, wherein said first and second signals recur in discrete time intervals only, and said counting means is reset to zero between said time intervals.

4. A phase detector as defined in claim 3, including means for advancing or retarding the phase of said first signal in accordance with the most significant digit stored in said counting means at the end of each said discrete time interval.

5. A phase detector as defined in claim 4, wherein said first signal is supplied by a binary adder operating in response to continuously applied pulses having a repetition rate exceeding that of said first and second signals, and means for modifying the input to said adder in accordance with the most significant digit stored in said counting means.

6. Phase detector circuitry operative in response to binary signals of known repetition rate recurring in discrete time intervals, comprising a binary adder operative to cyclically add in response to pulses occurring at a rate greater than said known repetition rate with a cycle of operation equal to the period of said known repetition rate, means for extracting a binary reference output from said adder having the waveform and repetition rate of said binary signals, a logic OR gate receiving said binary signals and said reference output as inputs thereto, a reversible binary counter, means supplying counting pulses to said counter at a rate in excess of said known repetition rate, means for controlling the direction of count in said counter in accordance with the output of said OR gate, means for resetting said counter to zero after each said discrete time interval, and means for adding a quantity to said binary adder after each said discrete time interval determined by the number registered in said counter.

7. Phase detector circuitry as defined in claim 6, wherein the counting pulses are supplied to said counter during said discrete intervals.

* * * * *